United States Patent [19]
Daniel et al.

[11] Patent Number: 6,115,761
[45] Date of Patent: *Sep. 5, 2000

[54] FIRST-IN-FIRST-OUT (FIFO) MEMORIES HAVING DUAL DESCRIPTORS AND CREDIT PASSING FOR EFFICIENT ACCESS IN A MULTI-PROCESSOR SYSTEM ENVIRONMENT

[75] Inventors: Thomas Daniel, Los Altos; Anil Gupta, Fremont, both of Calif.

[73] Assignee: LSI Logic Corporation, Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,737

[22] Filed: May 30, 1997

[51] Int. Cl.[7] .............................. G06F 5/00; G06F 12/06
[52] U.S. Cl. .............................. 710/57; 710/52; 711/147; 711/150; 711/168; 711/208
[58] Field of Search .................................... 395/821, 877, 395/872; 711/147, 150, 168, 208; 710/1, 57, 52

[56] References Cited

U.S. PATENT DOCUMENTS

| | | |
|---|---|---|
| 4,980,852 | 12/1990 | Giroir et al. .............................. 364/900 |
| 5,050,072 | 9/1991 | Earnshaw et al. ...................... 364/200 |
| 5,365,485 | 11/1994 | Ward et al. .............................. 365/221 |
| 5,446,839 | 8/1995 | Dea et al. ................................ 395/163 |
| 5,577,212 | 11/1996 | Russ ........................................ 395/250 |
| 5,602,780 | 2/1997 | Diem et al. ......................... 365/189.01 |
| 5,604,866 | 2/1997 | Kolb et al. .............................. 709/235 |
| 5,655,133 | 8/1997 | Dupree et al. ..................... 395/800.23 |
| 5,794,073 | 8/1998 | Ramakrishnan et al. ............... 395/860 |

Primary Examiner—Thomas C. Lee
Assistant Examiner—Rehana Perveen

[57] ABSTRACT

To reduce FIFO access cycles across a system bus in a multi-processor system in which two processors communicate across a system bus through a FIFO, two separate FIFO descriptors are provided. The first descriptor is maintained by the processor located on-board with the FIFO, and the second descriptor is maintained by an off-board processor which communicates with the FIFO across the bus. When one processor performs a FIFO operation, the processor updates the other processor's descriptor via a memory access across the bus. Additionally, one module passes credits to the other to indicate that the latter has permission to perform a plurality of FIFO operations consecutively. In one embodiment a special non-valid data value is used to indicate an empty FIFO position.

12 Claims, 8 Drawing Sheets

INITIAL

FIG._4A

AFTER 1 PutFifo

FIG._4B

AFTER 2 PutFifo

FIG._4C

AFTER 2 PutFifo
AND 1 GetFifo

FIG._4D

AFTER 3 PutFifo
AND 1 GetFifo

FIG._4E

AFTER 4 PutFifo
AND 1 GetFifo

FIRST-IN-FIRST-OUT (FIFO) MEMORIES HAVING DUAL DESCRIPTORS AND CREDIT PASSING FOR EFFICIENT ACCESS IN A MULTI-PROCESSOR SYSTEM ENVIRONMENT

BACKGROUND OF THE INVENTION

1. Field of the Invention

The present invention relates to the field of computer memories. More particularly, the present invention relates to the field of First-In-First-Out memories for multi-processor computer systems.

2. Description of the Related Art

First-In-First-Out memories (FIFOs) are commonly used in electronic systems. FIFOs are used to transfer data between two electronic devices or modules where the data source (data writer) produces data asynchronously to a data sink's (data reader's) need for the data. The data is written into the FIFO by the writer as it is produced, and then read from the FIFO by the reader as the data is needed.

A FIFO is typically composed of a buffer where the data elements are stored, and descriptors which contain control information about the FIFO such as pointers to the storage locations where the next read or write operations should occur. An important consideration in the design of a FIFO is to prevent FIFO overflow and underflow conditions. A FIFO overflow occurs when the FIFO is full (all the buffer locations are used) and the writer attempts to insert a new data element. A FIFO underflow occurs when the FIFO is empty (there are no elements in the buffer) and the reader attempts to retrieve an element from the buffer. FIFO buffers may be implemented in many ways including arrays, linked lists and dedicated hardware memories. Similarly, FIFO descriptors may be software data structures or dedicated hardware circuits.

In many systems with multiple processors communicating among each other, each processor may have part or all of its memory accessible by other processors. Such memory will be referred to as shared memory, while processor memory that is not accessible for other processors will be called private memory. A subsystem, which includes a processor together with its private and shared memory, is typically interconnected with other subsystems by a bus. An example of such a bus is the industry standard Peripheral Component Interconnect (PCI) bus.

Figure 1:
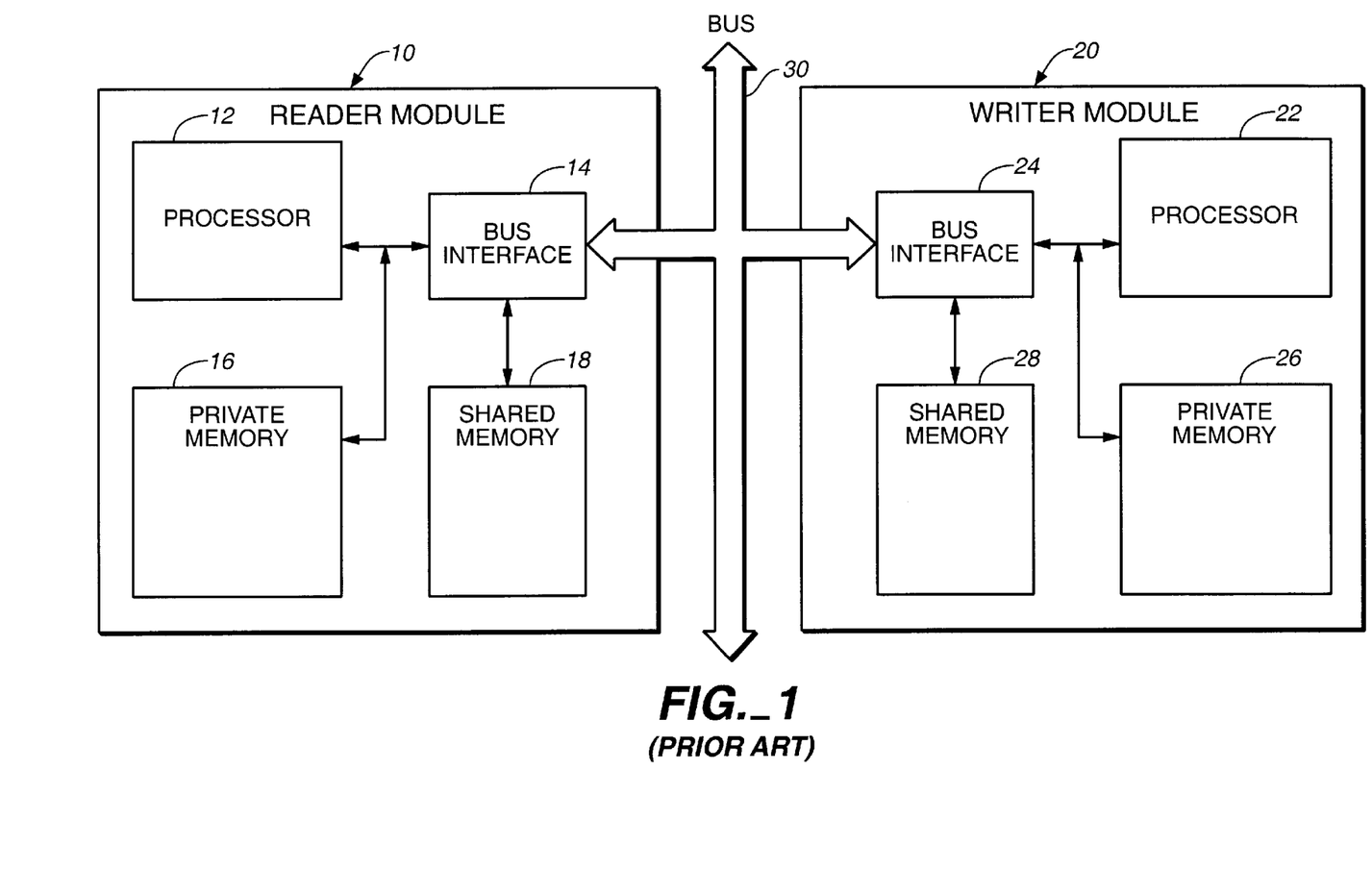
FIG. 1 is a block diagram of an electronic system having multiple processors which communicate across a system bus.

FIG. 1 shows a typical system having two electronic subsystem modules, each module including a processor and associated memory. A first module 10 which reads from a FIFO, and a second module 20 which writes to the FIFO, are connected via bus 30. Reader module 10 includes a processor 12, bus interface logic 14, private memory 16, and shared memory 18. Similarly, Writer module 20 includes a processor 22, bus interface logic 24, private memory 26, and shared memory 28. For each module, its shared memory is accessible by the other module. In such a system, only one subsystem may be the master of the bus at a given time. The master requests the bus, waits until the bus is granted, and then initiates a transaction resulting in data being transferred to one or more other subsystems. If another subsystem has data to transfer at the same time, that second subsystem has to wait until the current bus master terminates the transaction. The time elapsed between the bus request and the first element of data being transferred is called bus latency. The bus latency typically increases with the number of subsystems using the bus and the average length of a transaction.

The simplest implementation for a FIFO is to use dedicated hardware circuits. In this case, a write controller performs a write transaction to a fixed memory location. The hardware based FIFO manager stores the data in the order it was received and informs the writer when an overflow condition occurs via a discrete output from the FIFO. A read controller performs a read transaction from the FIFO mapped at a fixed memory location and the FIFO manager makes the data available at the FIFO output port from its internal storage, in the order it was put there by the writer. Examples of such FIFOs include fall-through FIFOs and RAM based FIFOs.

Figure 2:
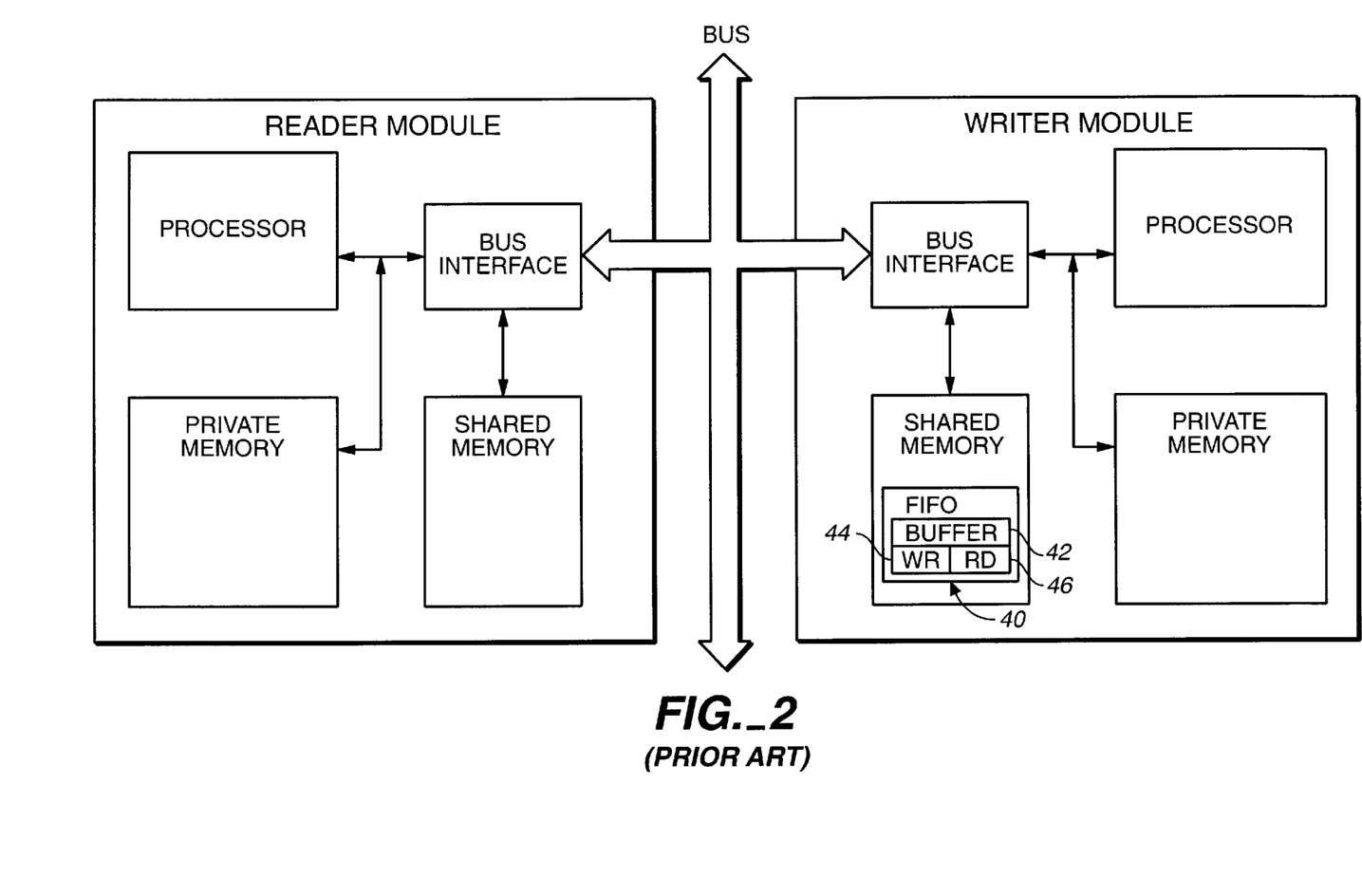
FIG. 2 is a block diagram of a conventional memory array FIFO implementation in the system of FIG. 1.

FIG. 2 illustrates a second way to implement a FIFO. In this implementation, both the FIFO buffer and the FIFO descriptor are implemented in shared memory. This implementation will be described further below.

In the discussion that follows the algorithms used to implement the FIFO will be described using the C programming language for illustration purposes. The actual implementation may employ a different language, assembly language, or a hardware FIFO manager. Similarly, the FIFO buffer will be described as a RAM-based array holding data elements, although other implementations are possible. In the example of FIG. 2, the FIFO is implemented in memory that is on-board to the writer electronic module. Alternatively, the FIFO could be implemented within shared memory on-board to the reader module, with appropriate changes to the read and write algorithms.

In a first conventional implementation A, the FIFO descriptor is composed of two pointers (a read pointer, RD, and a write pointer, WR) and two binary flags (a full flag and an empty flag). The corresponding C programming language type definition statement is:

IMPLEMENTATION A

```
1   typedef struct {
2       int WR;      /*initialized to 0 */
3       int RD;      /* initialized to 0 */
4       int Full;    /* initialized to 0 */
5       int Empty;   /* initialized to 1 */
6   { FifoDesc_t, *pFifoDesc_t;
7
8   Elem_t Fifo [SIZE];
```

In this implementation, an operation of retrieving an element from a FIFO may be implementing by the following GetFifo routine:

```
9    GetFifo (pFifoDesc_t FifoDesc, pElem_t Elem)
10   {
11       if (FifoDesc->Empty)           /* R(Empty) */
12           return 0;
13       *Elem=Fifo [FifoDesc->RD] ;    /* R(RD) + */
                                        /* R(Fifo [RD] */
14       if (++FifoDesc->RD == SIZE)
15           FifoDesc->RD = 0;          /*W(RD) 8/
16       if (FifoDesc->RD == FifoDesc->WR)  /* R(WR) */
17           FifoDesc->Empty = 1;       /* W(Empty) */
18       return 1;
19   }
```

The read and write operations across the bus are indicated by the comments to the code.

The above routine is called to retrieve an element from the FIFO. If the FIFO is empty, the routine returns failure code 0. Otherwise, the data element is copied to the destination and the FIFO RD pointer is advanced. If the FIFO RD pointer comes to equal the FIFO WR pointer, the FIFO is empty. This FIFO read routine requires four read operations and two write operations across the bus.

To write an element into the FIFO, the routine PutFifo is called:

```
20  int PutFifo (pFifoDesc_t FifoDesc, Elem_t Elem)
21  {
22      if (FifoDesc->Full)
23          return 0;
24      Fifo [FifoDesc->WR] = Elem;
25      if (++FifoDesc->WR == SIZE)
26          FifoDesc->WR = 0;
27      if (FifoDesc->WR == FifoDesc->RD)
28          FifoDesc->Full = 1;
29      return 1;
30  }
```

The above routine first checks FIFO status and returns failure code 0 if the FIFO is full. Otherwise, the data element is copied to the FIFO buffer and the WR pointer is incremented. If the WR pointer equals the RD pointer, the FIFO has become full. The PutFifo routine does not require any bus transactions because the FIFO is on-board to the Writer module in this example.

Figure 3A:
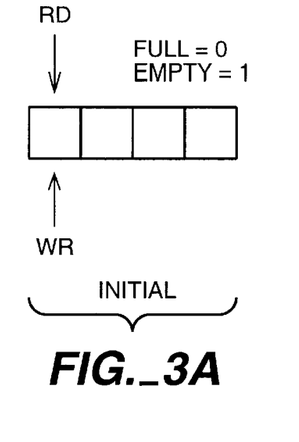
FIGS. 3A through 3G illustrate the use of RD and WR pointers and Full and empty flags in a conventional FIFO.
Figure 3B:
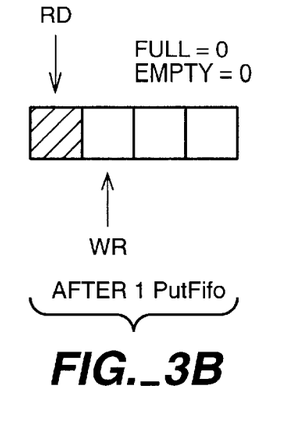
Figure 3C:
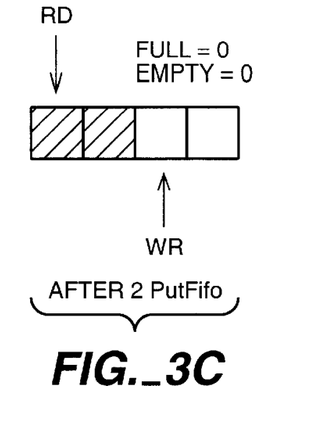
Figure 3D:
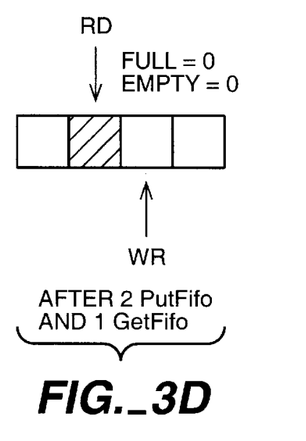
Figure 3E:
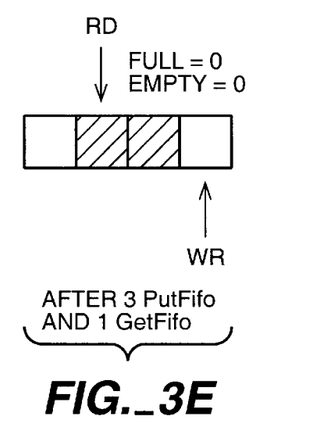
Figure 3F:
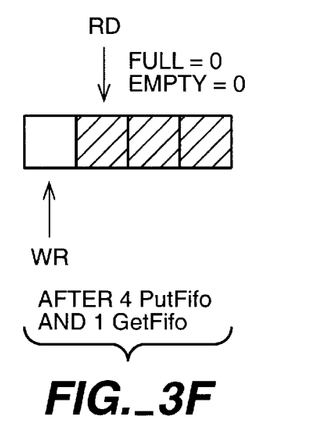
Figure 3G:
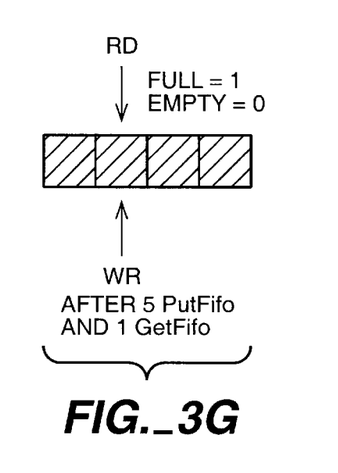
Figure 4A:
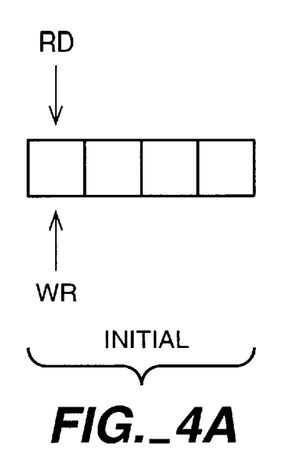
FIGS. 4A through 4F illustrate the use of RD and WR pointers in a conventional technique which eliminates the Full and Empty flags of FIG. 3.
Figure 4B:
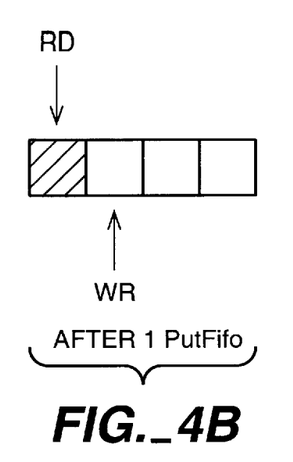
Figure 4C:
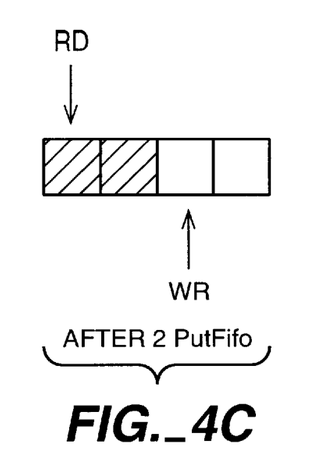
Figure 4D:
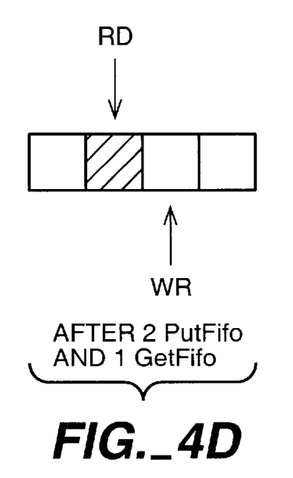
Figure 4E:
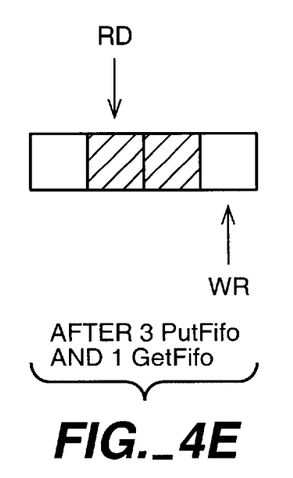
Figure 4F:
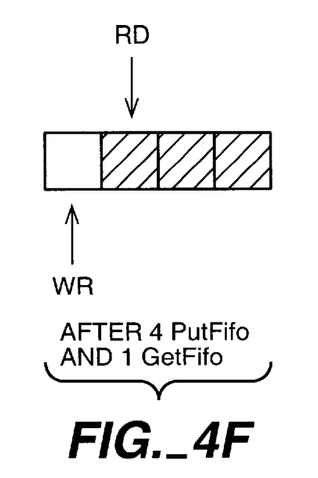

FIGS. 3A through 3G illustrate the writing of data to the FIFO and the reading of data from the FIFO, and the corresponding conditions of the Full and Empty flags. FIGS. 3E and 3F illustrate how the WR pointer, for example, wraps around from the end of the FIFO back to the beginning.

In a second implementation B of a shared memory FIFO, full and empty flags are not used. For this alternate implementation the type definition statement is:

IMPLEMENTATION B

```
1   typedef struct {
2       int WR;         /* initialized to 0 */
3       int RD;         /* initialized to 0 */
4   } FifoDesc_t, *pFifoDesc_t;
5
6   Elem_t Fifo [SIZE];
```

In this implementation, an operation of retrieving an element from a FIFO may be implementing by the following GetFifo routine:

```
7   int GetFifo (pFifoDesc_t FifoDesc, pElem_t Elem)
8   {
9       if (FifoDesc->RD == FifoDesc->WR
                            /* R(RD + R(WR) */
10          return 0;
11      *Elem = Fifo [FifoDesc->RD];   /* R(Fifo [RD])*/
12      if (++FifoDesc->RD == SIZE)    /* W(RD) */
13          FifoDesc->RD = 0;
14      return 1;
15  }
```

The above routine is called to retrieve an element from the FIFO. If the FIFO is empty (RD pointer equals WR pointer), the routine returns failure code 0. Otherwise, the data element is copied to the destination and the FIFO RD pointer is advanced. The routine uses 3 Read and 1 Write transaction across the bus.

Similarly, to insert an element into a FIFO, the following PutFifo routine is called:

```
16  int PutFifo (pFifoDesc_t FifoDesc, Elem_t Elem)
17  {
18      int WR = FifoDesc->WR + 1;
19      if (WR == SIZE)
20          WR = 0;
21      if (WR == FifoDesc->RD)
22          return 0;
23      FifoDesc->WR = WR;
24      Fifo [FifoDesc->WR] = Elem;
25      return 1;
26  }
```

The above routine first checks FIFO status and returns failure code 0 if the FIFO is full (an incremented WR pointer would equal the RD pointer). Otherwise, the data element is copied to the FIFO buffer and the WR pointer is incremented.

FIGS. 4A through 4F illustrate the use of the RD and WR pointers in this implementation. Note that with this implementation there is always one element of the FIFO that remains unused.

Each of the above two implementations is safe from race conditions due to asynchronous and overlapping execution of the GetFifo and PutFifo routines by different processors. They are also hazard free because only the Reader can modify the RD pointer and only the Writer can modify the WR pointer.

In FIG. 2 the FIFO buffer and descriptor are located in shared memory of the Writer. This is not optimal because write operations over a bus are typically much less expensive (time-consuming) than read operations both from a bus utilization perspective and in considering latency as experienced by the master device. The reason for this is that write operations are non-blocking while read operations are typically blocking. When a data element is written to a target device over a bus such as PCI, then the initiator device typically writes the data into the PCI master FIFO and then continues with other tasks. From that perspective, a write operations is a "shoot-and-forget" type of operation. When the PCI controller acquires the bus, it has data available in the internal FIFO and may stream it over the bus immediately.

In contrast to write operations, read operations are typically blocking. When an initiator has to read a data element from a target device over the PCI bus, it has to request the bus, place the target address onto the bus, and wait until the data is retrieved by the target device and placed on the bus. This may cause a significant delay due to bus latencies. When the bus is acquired and the target is selected by address decoding logic, the PCI controller has to fetch data from the target location and place it on the bus. For example, a DRAM based memory may require as much as 120 ns (four cycles) to place the data on the bus, assuming the memory is not being accessed by a different device. These four cycles are then lost as far as bus utilization is concerned.

If read latency is sufficiently high then advantages may be realized by the target device immediately disconnecting after decoding its own address. The master device is required to retry the same operation. In the meantime the target has time to fetch data and place it in its slave read FIFO. In between the bus arbiter may decide to grant the bus to another target, effectively increasing the time for the target to fetch data without adversely affecting bus utilization. However, even this method increases bus utilization since the bus must be arbitrated twice for the same data. This method also does not resolve the master blocking issue. To the contrary, it may actually make things worse due to bus rearbitration.

SUMMARY OF THE INVENTION

There are several disadvantages of the implementations described above.

A hardware managed FIFO requires dedicated hardware resources which increases system costs. The size of the FIFO buffer is fixed and usually cannot be changed. The memory used to implement FIFO buffer is typically more expensive than bulk memory such as DRAM used to implement shared memories. Status information such as underflow and overflow has to be signaled by dedicated circuits which will often be incompatible with standard buses of defined width. If dedicated circuits for status signaling cannot be used, the hardware managed FIFOs must signal their status through the bus, which results in performance bottlenecks.

The shared memory implementations discussed above depend heavily on bus transfers to implement the FIFO access routines. This is a significant problem when the bus has a high latency, such as is common for a PCI bus. The cost (wait time) of accessing a shared memory location located in a different subsystem module is typically much higher than the cost of accessing a memory that is located on-board the module that is accessing the data.

Because the above-described FIFO access routines access the FIFO multiple times over the bus for a single FIFO access operation, and because many buses experience a high latency, accessing the FIFO results in a significant system performance bottleneck. FIFO accesses also can consume a high percentage of the available bus duty cycle.

Accordingly, it is an object of the present invention to provide a FIFO structure and a method of accessing a FIFO which results in much faster FIFO access times, and eliminates the performance bottlenecks typically associated with FIFO accesses across a bus.

In order to reduce the utilization of the bus, according to a first embodiment of the present invention the FIFO is provided with two separate descriptors, one per processor. Each FIFO descriptor includes a RD pointer (pointing to the next location within the FIFO to be read from), and a WR pointer (indicating the next location within the FIFO to be written into). In order to determine whether the FIFO is available for a FIFO operation, each processor need only check its own on-board descriptor. If the on-board descriptor indicates that the FIFO is available, then the first processor performs a FIFO operation. After the FIFO operation is complete the first processor updates both its own descriptor and the second processor's descriptor to inform that processor that the FIFO is available to the second processor for a FIFO operation. Because a processor only has to access its own on-board descriptor to determine whether the FIFO is available, and because the FIFO performs an operation across the bus only after a FIFO operation, the number of accesses required to write a datum into the FIFO and retrieve the datum is reduced. In a system with a high latency bus, this reduction in bus transactions significantly increases FIFO throughput.

A second embodiment eliminates the WR pointer on-board to the FIFO reader module by predefining a special value to be non-valid data. When the Reader processor finds this non-valid data value in the FIFO, the processor knows that the FIFO is empty. Since the Reader knows when the FIFO is empty merely by examining the FIFO contents, the Reader does not need its own WR pointer to compare against its RD pointer. This eliminates the bus transactions that would otherwise be required for the Writer module to update the Reader's WR pointer.

A third embodiment achieves still further reductions in bus accesses by passing credits from the first processor to the second. The credits represent the number of consecutive FIFO accesses that the second processor has permission to perform consecutively. For example, if the FIFO is full and the Reader reads five locations from the FIFO, there are now five locations newly freed up within the FIFO into which the Writer may write data. Accordingly, the Reader module passes five credits to the Writer module in a single bus transaction. The Writer module then has permission to write five consecutive elements into the FIFO. The passing of five credits with a single bus transaction reduces by four fifths the number of bus accesses required for the Reader module to update the Writer's RD pointer. The consecutive FIFO accessing over the bus also allows page mode accessing to be used, providing that the particular bus and FIFO memory used support page mode accessing. Where supported, page mode accessing allows multiple data to be written in much less time than would be required to write each datum individually.

By reducing the number of bus transactions required per FIFO data element, and utilizing the faster transaction time for write operations than for read operations, the present invention achieves a throughput increase of five to ten times that possible with prior FIFO structures and access methods.

The above-described objects of the present invention and other features and benefits of the present invention will become clear to those skilled in the art when read in conjunction with the following detailed description of a preferred illustrative embodiment and viewed in conjunction with the attached drawings in which like reference designators refer to like parts, and appended claims.

DETAILED DESCRIPTION OF THE INVENTION

Figure 5:
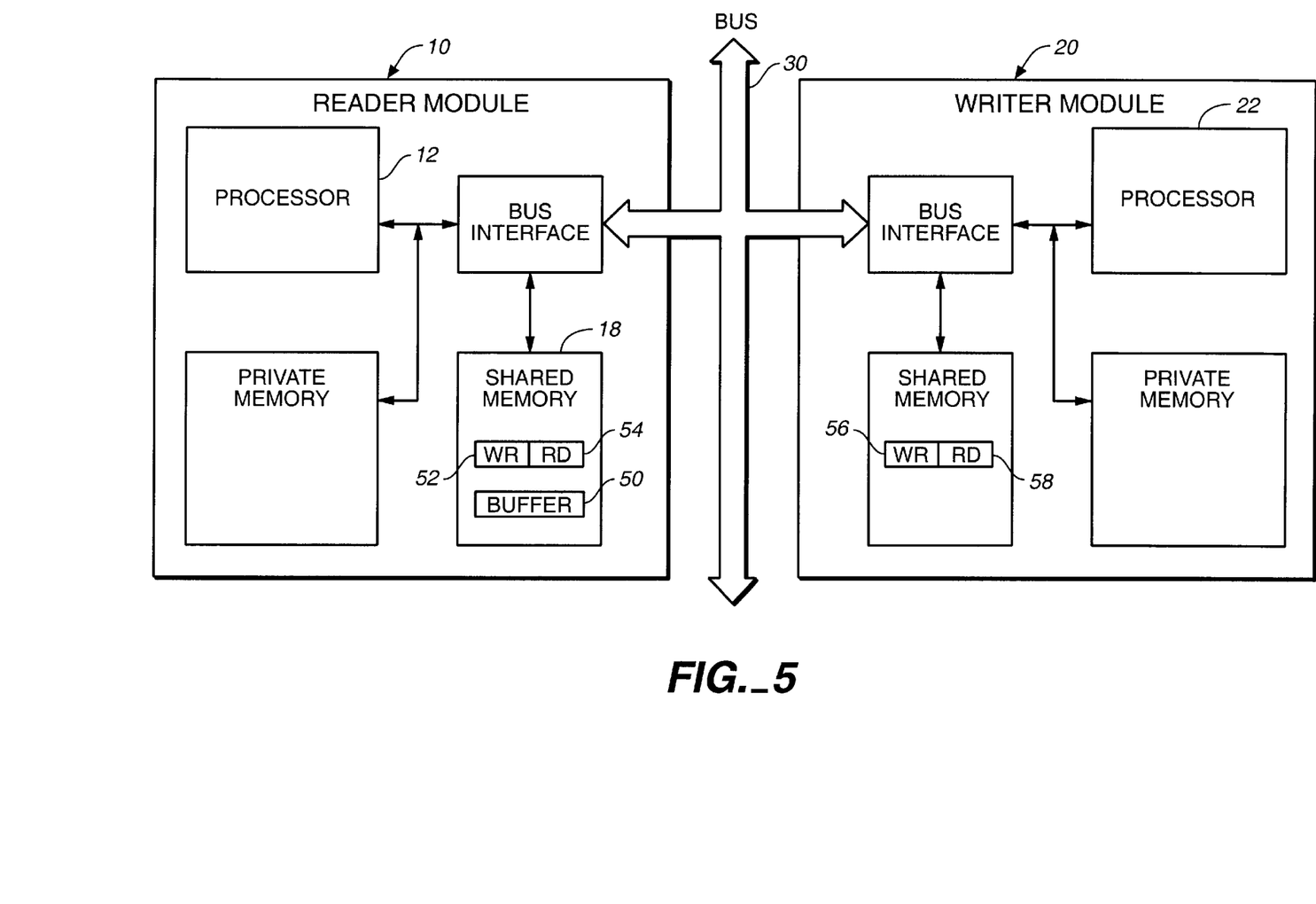
FIG. 5 is a block diagram showing the dual-descriptor FIFO of an illustrative first embodiment of the present invention.

A first illustrative embodiment of the novel dual descriptor FIFO of the present invention is shown in FIG. 5. The Writer module 20 includes a processor 22 which controls FIFO write operations. Writer module 20 includes two pointers maintained on-board: a first WR pointer 56 and a first RD pointer 58. Reader module 10 includes a processor 12 which serves as a RD controller for transferring data from the FIFO. FIFO buffer 50 resides within shared memory 18 on the Reader module. This shared memory is accessible by the Writer module 20 across bus 30. Reader module 10 maintains two on-board pointers of its own: WR pointer 52 and RD pointer 54. As used herein, the term "on-board" means that the pointer resides on the same side of the bus as the processor, so that the processor need not perform a bus transaction in order to access the pointer.

The advantage in providing two separate descriptors is that the module that is on the opposite side of the bus from the FIFO no longer needs to performs bus operations to determine whether the FIFO is available for an operation. For example, in FIG. 5, the Writer module 20 does not need to access RD pointer 54 or WR pointer 52 across the bus in order to determine whether the FIFO is full. Rather, the Writer module can simply access its own WR pointer 56 and RD pointer 58 and compare the two. Only if the FIFO is not full will the Writer access the bus in order to write data into FIFO buffer 50.

In this implementation, the FIFO descriptor is as follows:

```
1   typedef struct {
2       int WR;         /* initialized to 0 */
3       int RD;         /* initialized to 0 */
4       int *Other;     /*In writer descriptor, this*/
5                       /*is initialized */
6                       /* to &ReadDesc.WR*/
7                       /*In reader descriptor, this*/
8                       /* is initialized to */
9                       /* &WriterDesc.RD */
10  } FifoDesc_t, *pFifoDesc_t;
11
12  Elem_t Fifo [SIZE];
```

In the Writer's descriptor, *Other pointer points to the Reader's WR pointer. In the Reader's descriptor, the *Other pointer points to the Writer's RD pointer.

The GetFifo routine used by the reader to retrieve a data element is as follows:

FIRST EMBODIMENT

```
13  int GetFifo (pFifoDesc_t FifoDesc, pElem_t Elem)
14  {
15      if (FifoDesc->RD == FifoDesc->WR)
16          return 0;
17      *Elem = Fifo [FifoDesc->RD];
18      If (++FifoDesc->RD == SIZE)
19          FifoDesc->RD = 0;
20      *(FifoDesc->Other) = FifoDesc->RD;
                                    /* W(*Other)* /
21      return 1;
22  }
```

Similarly, the PutFifo routine used by the Writer is as follows:

```
23  int PutFifo (pFifoDesc_t FifoDesc, Elem_t Elem)
```

-continued

```
24  {
25      int WR = FifoDesc->WR + 1;
26      if (WR == SIZE)
27          WR = 0;
28      If (WR == FifoDesc->RD)
29          return 0;
30      *(FifoDesc->Other) = WR;      /* W(Other) */
31      FifoDesc->WR = WR;
32      Fifo [FifoDesc->WR] = Elem;   /* W(Elem) */
33      return 1;
34  }
```

This implementation requires only 3 total writes per data element.

Figure 6:
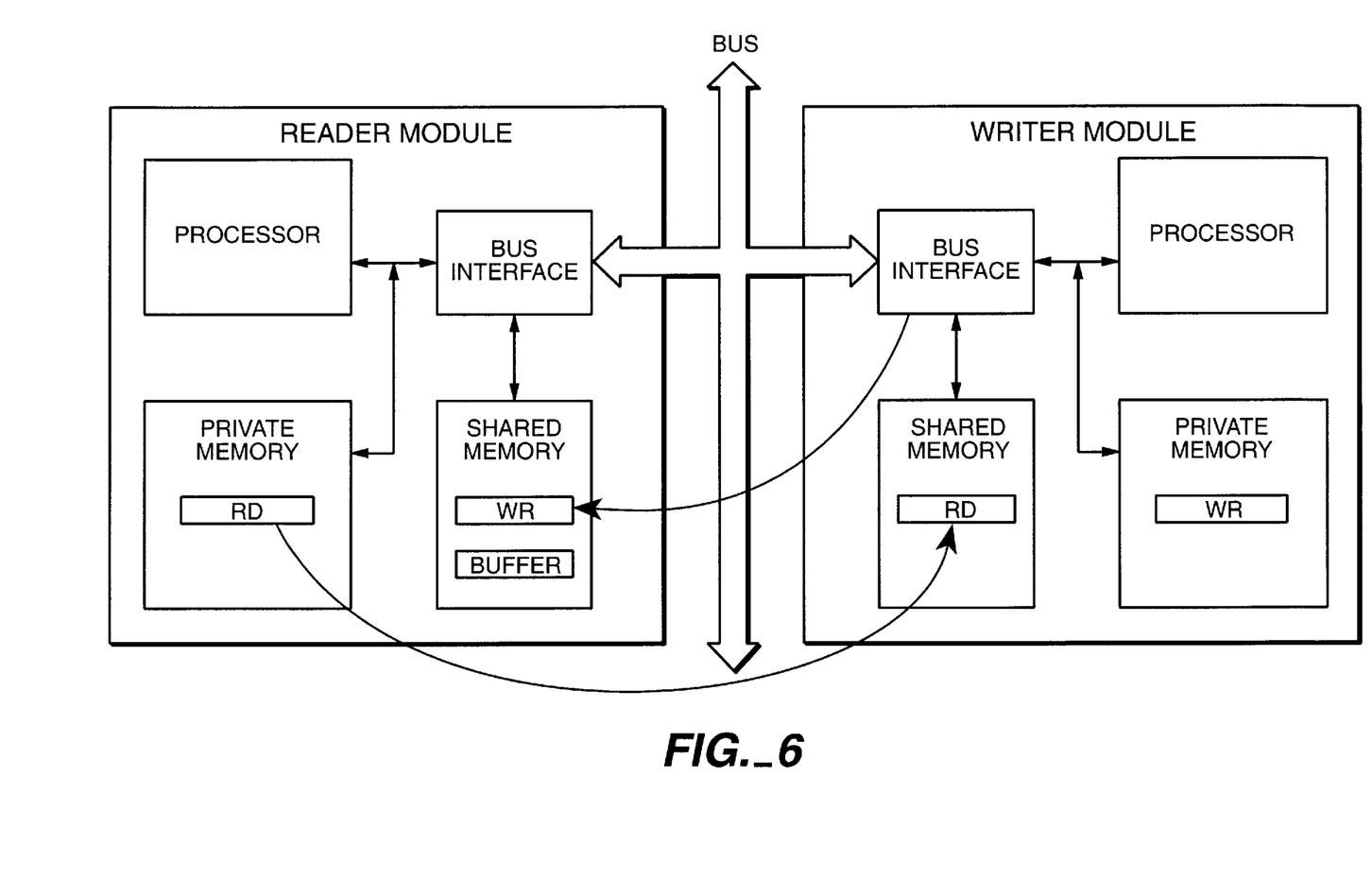
FIG. 6 is a memory model of a further improved dual-descriptor FIFO.

The foregoing implementation may be further improved by splitting the descriptor in half as shown in FIG. 6. For the Writer, the WR pointer is kept in private and not shared memory. The RD pointer is kept in shared memory so that when the Reader module performs a read operation, the Reader module can update the Writer's RD pointer. Similarly, for the Reader, the RD pointer is kept in private memory. The WR pointer is kept in shared memory so that when the Writer performs a write operation the Writer can update the Reader's WR pointer. Because the Reader module accesses its RD pointer in private memory rather than shared memory which must be arbitrated, the Reader's accesses to its own RD pointer are faster than if the RD pointer resided in shared memory. This implementation improves the speed of accesses to a module's on-board descriptor; it does not otherwise effect the speed and frequency of accesses to the bus.

A second embodiment employs the structure of the first embodiment, but with an additional improvement. Observe that for the first embodiment the Writer module must update the Reader's WR pointer in order for the Reader to detect a FIFO underflow condition. This update to the Reader's WR pointer requires a bus operation. This update including the bus operation may be eliminated if a special value is predefined as representing an empty FIFO position. This pre-defined value is non-valid FIFO data. For example, in a particular system it may be known that the Writer will never write FIFO data of zero to the FIFO. In such a system, zero could be defined as the non-valid FIFO data representing an empty FIFO position. At initialization, the FIFO will be filled with zero at all locations. When the Writer first fills a location with valid data, the zero data is replaced with valid data. The Reader module recognizes this non-zero data as valid data. After retrieving valid data from the FIFO, the Reader replaces the valid data with zero to indicate that the FIFO location no longer contains valid data. Until that location is overwritten with valid data by the Writer, any attempt by the Reader to read data from that location will result in the Reader recognizing the location as containing zero (non-valid) data, and the Reader continuing to wait for valid data.

The special value predefined as non-valid data will not be zero for every system, but will reflect a data value which would not normally represent valid data in that particular system. The value of zero is chosen in the present discussion merely for purposes of illustrating the invention. With the special predefined value being named Zero for illustration purposes, the PutFifo and GetFifo routine for this second embodiment are as follows:

SECOND EMBODIMENT

```
1   int GetFifo (pFifoDesc_t FifoDesc, pElem_t Elem)
2   {
3       if (Fifo [FifoDesc->RD] == Zero
4           return 0;
5       *Elem = Fifo [FifoDesc->RD];
6       Fifo [FifoDesc->RD] = Zero;
7       if (++FifoDesc->RD == SIZE)
8           FifoDesc->RD = 0;
9       *(FifoDesc->Other) = FifoDesc->RD;
                                       /*W(*Other) */
10      return 1;
11  }
```

The FIFO buffer is initialized to all Zero. Now, a Reader can check the next FIFO location and if it is Zero, the FIFO is empty. Otherwise, the Reader retrieves the data element and then puts Zero in the FIFO buffer to mark this location as empty. The PutFifo routine for this second embodiment is as follows:

```
12  int PutFifo (pFifoDesc_t FifoDesc, Elem_t Elem)
13  {
14      int WR = FifoDesc->WR +1
15      if (WR == SIZE)
16          WR = 0;
17      if (WR == FifoDesc->RD)
18          return 0;
19      FifoDesc->WR = WR;
20      Fifo [FifoDesc->WR] = Elem; /*W(Elem)*/
21      return 1;
22  }
```

Figure 7:
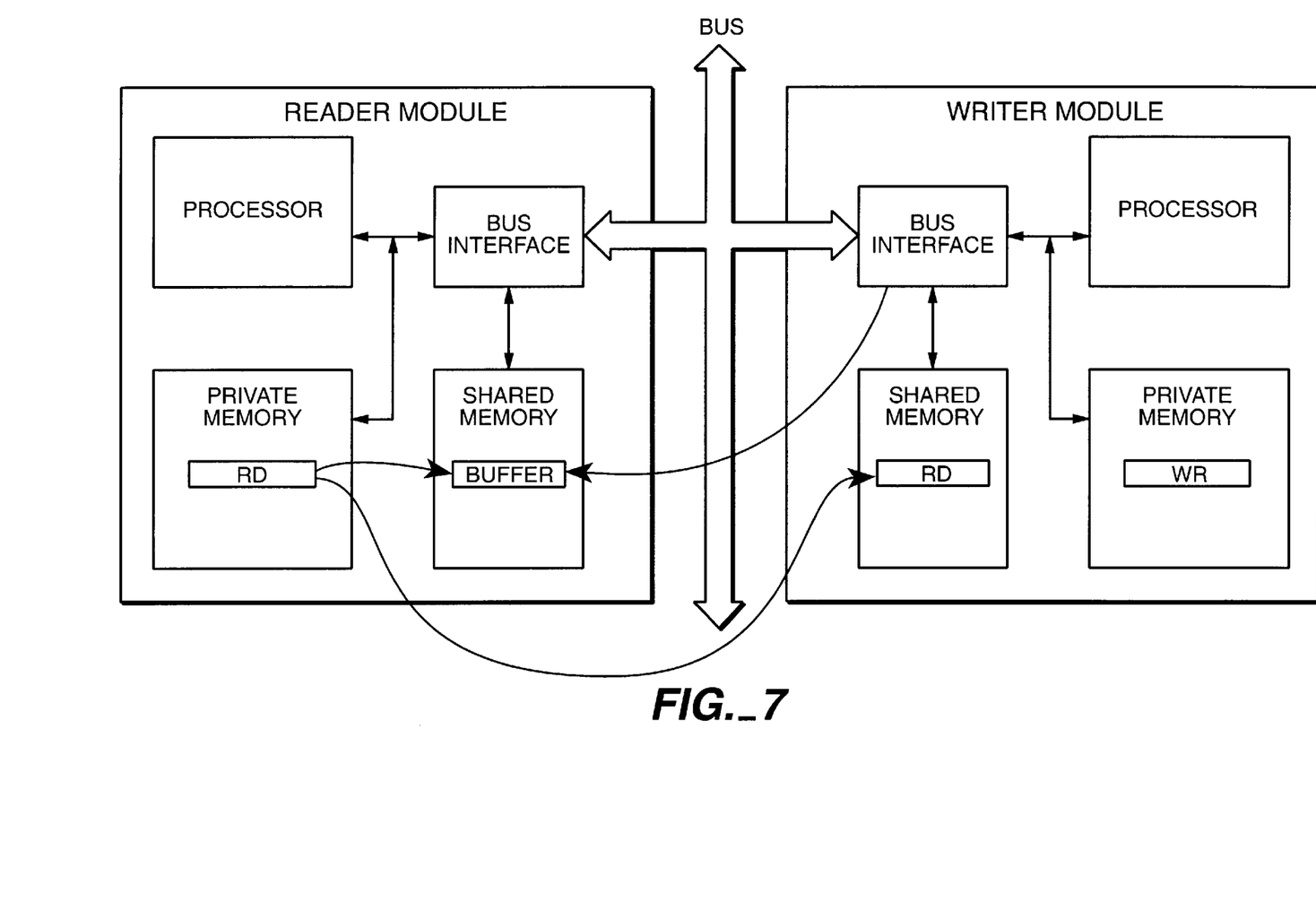
FIG. 7 is a memory model of a second illustrative embodiment in which the Reader module's WR pointer is eliminated.

In this embodiment, only two Writes across the data bus per data element are required: one Write to write a datum into the buffer during a Write operation, and one Write to update the Writer module's RD pointer at the end of a Read operation. The memory model for this embodiment is shown in FIG. 7.

Figure 8:
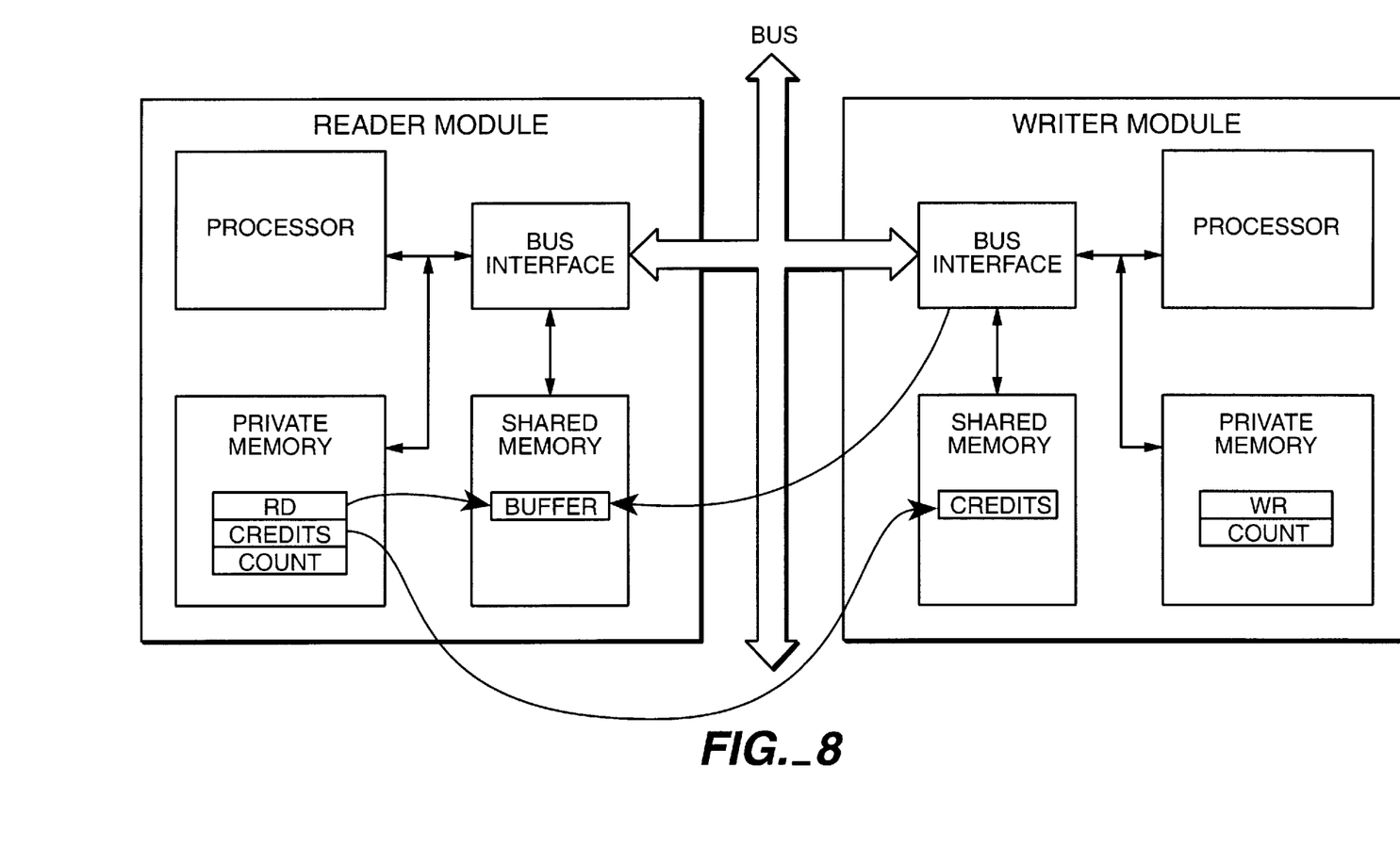
FIG. 8 is a memory model illustrating the use of FIFO credits in a third illustrative embodiment.

A third embodiment reduces the bus requirements for updating and maintaining the FIFO still further. The second embodiment described above eliminated the far WR pointer and hence any need to update the far WR pointer across the bus. It would also be desirable to eliminate the far RD pointer. In the third embodiment, the far RD pointer is not eliminated entirely, although the frequency of updating the RD pointer is significantly reduced. In this embodiment, the Reader gives the Writer authorizations, which shall be termed credits, to put more than one data element into the FIFO. Upon the occurrence of the Reader module reading a single location within the FIFO, the Reader does not signal the Writer module that the FIFO is not full. Rather, the Reader waits until it has read a number of data from the FIFO and only then signals the Writer module that the FIFO is no longer full and that the Writer therefore has permission to write data into the FIFO. Once the Writer module has been informed that the FIFO is no longer full, the Writer then proceeds to write a number of consecutive data into the FIFO by performing consecutive Write operations. The Writer does not need to check whether the FIFO is full between these Write operations because it has already been given a number of credits by the Reader. That is, the Reader has signaled to the Writer that at least N number of locations within the FIFO were empty. For example, if the Reader passes five credits to the Writer at a time, then the Reader will update the far RD pointer by five only every fifth Read operation, and the number of bus operations performed by the Reader will be ⅕ that of the previous embodiment. The memory model for this embodiment is shown in FIG. 8. If the number of credits is increased to approximately ½ the size of the FIFO, then the number of bus accesses required by the Reader module is decreased to approximately only two accesses per complete FIFO's worth of data. The code to implement this third embodiment is as follows:

THIRD EMBODIMENT

```
1   typedef struct {
2       int Ptr;        /*current element to be read*/
3                       /* retrieved from Fifo) */
4       int *Credit;    /* pointer to Credit field */
5                       /* in sender memory */
6       int Count;      /* total number of elements */
7                       /* retrieved from the Fifo */
8                       /* or current credit value */
9   } FifoDesc_t, *pFifoDesc_t;
10
12  Elem_t Fifo [SIZE];
13  int GetFifo (pFifoDesc_t FifoDesc, pElem_t Elem)
14  {
15      if (Fifo [FifoDesc->Ptr] == Zero
16          return 0;
17      *Elem = Fifo [FifoDesc->Ptr];
18      Fifo [FifoDesc->Ptr] = Zero;
19      if (++FifoDesc->Ptr == SIZE)
20          FifoDesc->Ptr = 0;
21      if ((++FifoDesc->Count % (SIZE/2)) == 0)
22          *FifoDesc->Credit = FifoDesc->Count;
23                                  /* W(*Credit)*/
24      return 1;
25  }
26
27  int PutFifo (pFifoDesc_t FifoDesc, Elem_t Elem)
28  {
29      if (*FifoDesc->Credit == FifoDesc->Count)
30          return 0;
31      Fifo [FifoDesc->Ptr = Elem;    /* W(Elem)*/
32      if (++FifoDesc->Ptr == SIZE)
33          FifoDesc->Ptr = 0;
34      FifoDesc->Count++;
35      return 1;
36  }
```

Since the Write at line 22 of GetFifo happens only twice per SIZE invocations of GetFifo, the average number of Writes in implementation D is 1+2/SIZE.

Credits can also be passed from a Writer to a Reader. An example of when it may be advantageous to do so is when the FIFO is located on the Writer module instead of the Reader. In that case, the Writer will write data into some number N of FIFO locations, then signal the Reader that N number of data are available for reading. The Reader then performs N consecutive FIFO read operations across the bus without checking to see whether the FIFO is empty in between the N write operations.

The number N of credits passed between modules need not be pre-defined. Rather, depending on the data being transferred and the modules' need for accessing the data, N can be variable under software control. N can be set either initially at start-up or dynamically if desired for maximum performance on the fly.

Table 1 below lists the bus transactions required using prior techniques and the present invention.

TABLE 1

Comparison of Bus Requirements for
Prior Methods vs. Present Invention

| Operations | PRIOR METHODS | | PRESENT INVENTION | | |
|---|---|---|---|---|---|
| | A | B | 1st Emb. | 2nd Emb. | 3rd Emb. |
| Reads | 4 | 3 | 0 | 0 | 0 |
| Writes | 2 | 1 | 3 | 2 | 1+2/SIZE |
| Total | 6 | 4 | 3 | 2 | 1+ |
| Weighted Total* | 10 | 7 | 3 | 2 | 1+ |

*Assumes that a read is twice as expensive as a write.

As Table 1 shows, assuming that a read is twice as expensive as a write, the third embodiment achieves nearly a ten-fold increase in performance compared to prior implementation technique A, and nearly a seven-fold increase over prior technique B.

The foregoing discussion illustrates illustrative embodiments of the invention when the FIFO is located on the Reader module. For that case, the Reader interfaces with the FIFO without requiring a bus transaction, and the Writer interfaces with the FIFO via a bus transaction. This is generally the preferred arrangement when the system includes one module that will always be the Reader, and one module that will always by the Writer. This is not always the case. In some systems there may be multiple Readers and one Writer. In such a case it may minimize circuit board real estate usage to place a single FIFO on the Writer module. In other systems, the circuit boards may be off-the-shelf items such that it is not possible to locate the FIFO on the Reader module. For these as well as other reasons, the FIFO may be located on the Writer module in a particular system. With slight modifications to the code which will be apparent to one skilled in the art of software, the above described invention can be applied equally to the case where the FIFO is located on the Writer module, or even on a third module.

The invention described above may be applied in any multiprocessor system. Possible applications include high speed multi-processor computers, disk drives and disk drive controllers, network peripherals, graphics engines, and networking systems including switches and routers. The invention has broader applications for any system in which a data source and a data sink communicate through a FIFO across a shared resource. Although the shared resource has been illustrated as a system bus, the shared resource could also be an arbitrated on-board data bus. It will also be apparent to one skilled in the art that the present invention is not confined to a system in which the data source and data sync are processors. For example, the data source or sink could be a mass memory device such as a magnetic disk. The data source could also be for example a bank of A/D converters in a sensor module.

Although the present invention has thus been described in detail with regard to the preferred embodiments and drawings thereof, it should be apparent to those skilled in the art that various adaptations and modifications of the present invention may be accomplished without departing from the spirit and scope of the invention. Accordingly, it is to be understood that the detailed description and the accompanying figures as set forth herein are not intended to limit the breath of the present invention which should be inferred only from the following claims and their appropriately construed legal equivalents.

What is claimed is:

1. An electronic system having a dual-descriptor FIFO, the system comprising:
   a data bus;
   a FIFO in communication with said bus;
   a Writer module in communication with said bus for providing data to the FIFO, the Writer module including:
      a write controller for transferring data to the FIFO;
      a first WRITE pointer indicating a location within the FIFO into which the Writer module may write data, the first WRITE pointer being accessible by the write controller; and
      a first READ pointer indicating a location within the FIFO from which a Reader module may read data, the first READ pointer being accessible by the write controller; and
   wherein the Reader module is in communication with said bus for reading said data from the FIFO written into said FIFO by said Writer module, the Reader module including:
      a read controller for transferring data from the FIFO;
      a second WRITE pointer indicating a location within the FIFO into which the Writer module may write data, the second WRITE pointer being accessible by the read controller; and
      a second READ pointer indicating a location within the FIFO from which the Reader module may read data, the second READ pointer being accessible by the read controller; and
      wherein said pair of WRITE pointers and said pair of READ pointers are each capable of pointing to common locations within said FIFO.

2. The system of claim 1 wherein:
the FIFO resides on the Reader module.

3. The system of claim 1 wherein:
the FIFO resides on the Writer module.

4. The system of claim 1 wherein:
the first WRITE pointer resides in memory that is private to the Writer module;
the second READ pointer resides in memory that is private to the Reader module; and
the first READ and second WRITE pointers reside in memory that is shared between said Writer and Reader modules.

5. The system of claim 1 wherein said bus is a Peripheral Component Interconnect (PCI) bus.

6. The system of claim 1 wherein one of said Reader and Writer modules is a disk drive controller.

7. The system of claim 1 wherein said FIFO comprises a Random Access Memory (RAM) that is shared between the Reader and Writer modules.

8. In a system containing a data bus, first and second electronic modules connected to said bus, and a FIFO that is connected to said bus and that is located on one of said first and second electronic modules, a method of controlling data transfer between said first and second modules via said FIFO, the method comprising the steps of:
   (a) providing and maintaining a first FIFO descriptor of said FIFO on-board to the first module, said first FIFO descriptor including first READ and WRITE pointers;
   (b) providing and maintaining a second FIFO descriptor of said FIFO on-board to the second module, said second FIFO descriptor including second READ and WRITE pointers;

(c) examining the first FIFO descriptor to determine whether the FIFO is not empty, and if the FIFO is not empty then reading from the FIFO, wherein the examining the first FIFO descriptor step comprises the step of comparing said first READ and WRITE pointers; and (d) examining the second FIFO descriptor to determine whether the FIFO is not full, and if the FIFO is not full then writing to the FIFO, wherein the examining the second FIFO descriptor step comprises the step of comparing said second READ and WRITE pointers.

9. The method according to claim 8 further comprising the step of:

upon the occurrence of data being written to said FIFO, updating both of said first and second FIFO descriptors.

10. In an electronic system employing a FIFO for data communication between a Writer module and a Reader module, said Writer module having a write controller and said Reader module having a read controller, the Reader module being in communication with the FIFO for reading data written thereto by the Writer module, a method of providing improved speed FIFO data transfers between the Writer module and the Reader module comprising the steps of:

(a) providing within said Writer module:
a first WRITE pointer indicating a location within the FIFO into which the Writer module may write data, the first WRITE pointer being accessible by the write controller; and
a first READ pointer indicating a location within the FIFO from which the Reader module may read data, the first READ pointer being accessible by the write controller;

(b) providing within said Reader module:
a second WRITE pointer indicating a location within the FIFO into which the Writer module may write data, the second WRITE pointer being accessible by the read controller; and
a second READ pointer indicating a location within the FIFO from which the Reader module may read data, the second READ pointer being accessible by the read controller;
wherein said pair of WRITE pointers and said pair of READ pointers are each capable of pointing to common locations within said FIFO.

11. The method of claim 10 further comprising the steps of:

(c) upon the occurrence of the Reader module reading data from the FIFO,
(1) counting a number n of data that the Reader module reads; and
(2) waiting until n reaches a predetermined number N then incrementing the first READ pointer by N where N is greater than one;

(d) The Writer module comparing the first READ pointer and the first WRITE pointer to determine whether the FIFO is full; and (e) If the FIFO is not full, then the Writer module writing data into N number of locations within the FIFO.

12. The method of claim 10 further comprising the steps of:

(f) pre-defining a certain value as representing non-valid FIFO data;

(g) upon the occurrence of the Reader module reading data from a first location within the FIFO, the Reader module writing said pre-defined value into said first location; and (h) upon the occurrence of the Reader module reading said value from the FIFO, identifying said value as representing non-valid data.

* * * * *